(12) United States Patent
Kempainen et al.

(10) Patent No.: US 8,474,326 B2
(45) Date of Patent: Jul. 2, 2013

(54) LOAD PIN WITH INCREASED PERFORMANCE

(75) Inventors: Alan John Kempainen, Ostrander, OH (US); Sunil Job, Kerala (IN); Sivaprakash Eswaran, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 240 days.

(21) Appl. No.: 13/048,631

(22) Filed: Mar. 15, 2011

(65) Prior Publication Data

US 2012/0234100 A1    Sep. 20, 2012

(51) Int. Cl.
*G01N 3/02* (2006.01)

(52) U.S. Cl.
USPC ............................................. 73/856; 73/760

(58) Field of Classification Search
USPC .................................................... 73/760, 856
See application file for complete search history.

(56) References Cited

U.S. PATENT DOCUMENTS

| | | | |
|---|---|---|---|
| 3,857,452 A | 12/1974 | Hartman | |
| 3,992,934 A | 11/1976 | Clark | |
| 4,076,430 A * | 2/1978 | Crook, Jr. | 403/154 |
| 4,165,637 A | 8/1979 | Kooman | |
| 4,576,053 A * | 3/1986 | Hatamura | 73/862.629 |
| 4,858,475 A | 8/1989 | Jacobson et al. | |
| 5,154,626 A * | 10/1992 | Watson | 439/268 |
| 5,309,372 A | 5/1994 | Marui et al. | |
| 6,309,208 B1 | 10/2001 | Kazmer et al. | |
| 6,370,971 B1 | 4/2002 | Olson | |
| 6,408,688 B2 | 6/2002 | Foley et al. | |
| 6,746,058 B2 * | 6/2004 | Kienzler | 292/175 |
| 6,766,685 B2 | 7/2004 | Foley et al. | |
| 6,769,315 B2 | 8/2004 | Stevenson et al. | |
| 6,955,098 B2 | 10/2005 | Schulze et al. | |
| 7,331,243 B2 | 2/2008 | Pfeffer | |
| 7,644,636 B2 * | 1/2010 | Gregory et al. | 73/862.621 |
| 2003/0106369 A1 | 6/2003 | Foley et al. | |
| 2003/0160412 A1 | 8/2003 | Constans | |
| 2004/0055832 A1 | 3/2004 | Mercer | |
| 2006/0082090 A1 | 4/2006 | Constans | |

FOREIGN PATENT DOCUMENTS

| | | | |
|---|---|---|---|
| DE | 102008001242 A1 | 5/2009 | |
| GB | 2031594 A | 4/1980 | |

OTHER PUBLICATIONS

EP search report, EP 12159542.5-1236—dated Aug. 6, 2012.

* cited by examiner

*Primary Examiner* — Max Noori
(74) *Attorney, Agent, or Firm* — Ingrassia Fisher & Lorenz, P.C.

(57) ABSTRACT

A load pin includes a main body, a plurality of recesses, and a plurality of sensor pockets. The main body has a plurality of loading surfaces and a plurality of relief surfaces formed therein. Each loading surface is disposed between two of the relief surfaces. The recesses are formed in and extend at least partially around the outer surface of the main body. Each recess has a substantially round inner surface, is formed in a different one of the relief surfaces, and is disposed between a different pair of loading surface. The sensor pockets are formed in the outer surface, extend partially into the main body, are disposed between a pair of loading surfaces, and extend through the recess that is disposed between the same pair of loading surfaces.

14 Claims, 3 Drawing Sheets

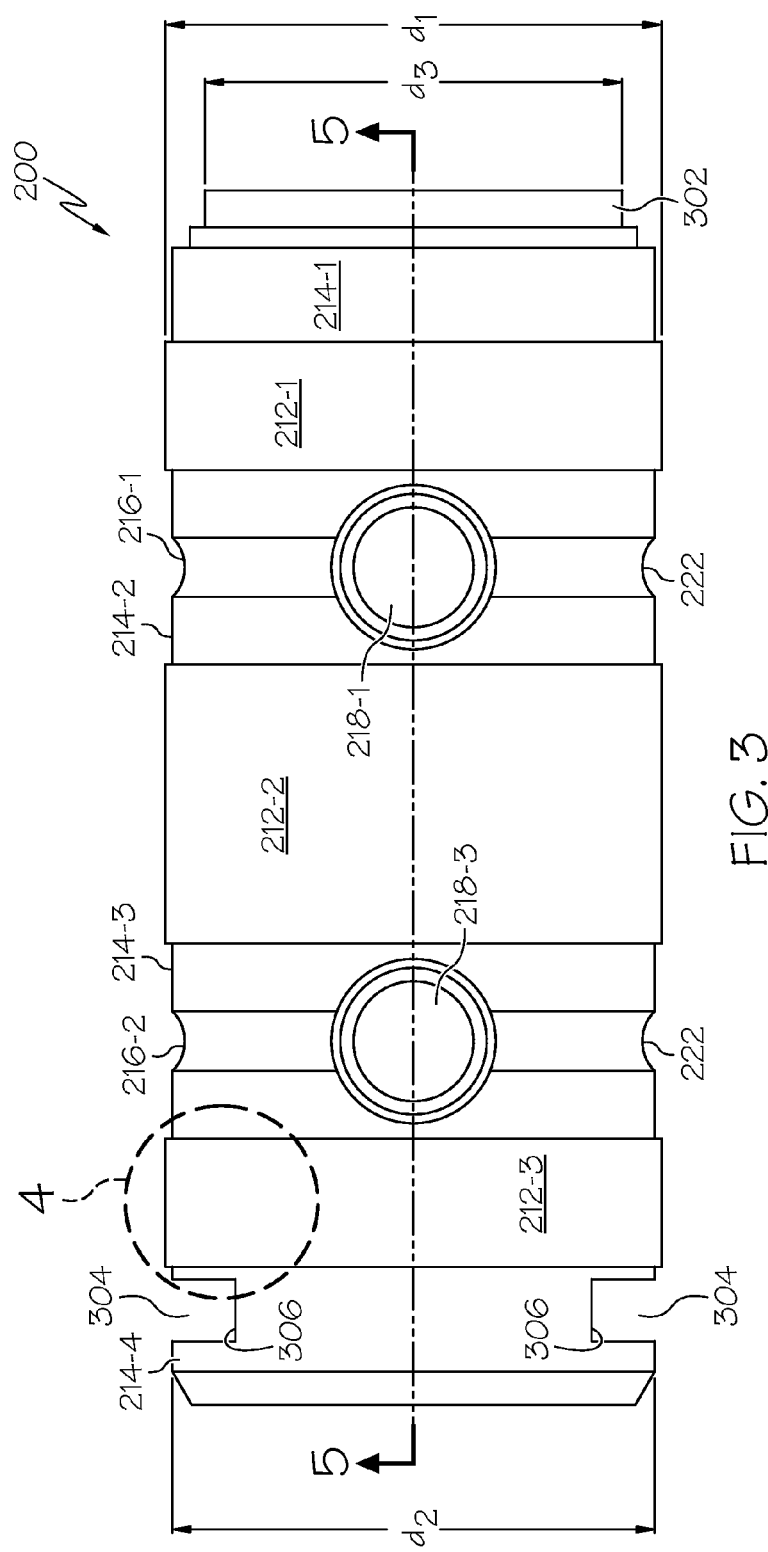
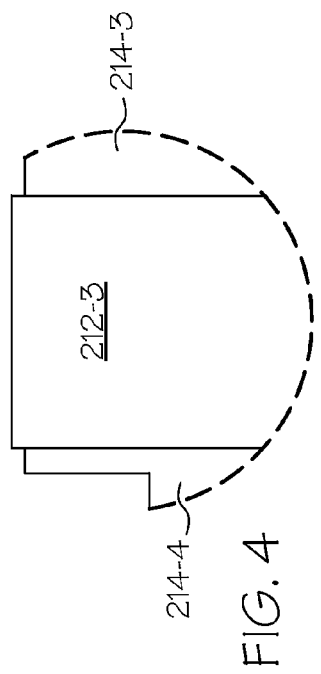
FIG. 3
FIG. 4

LOAD PIN WITH INCREASED PERFORMANCE

TECHNICAL FIELD

The present invention generally relates to load pins, and more particularly relates to a load pin that exhibits improved sensitivity under both tensile and compressive loads.

BACKGROUND

Load pins may be used to measure loads in various systems. A load pin equipped with one or more strain gages may be mounted into a machine in place of a shaft, a bolt, a pivot pin, or clevis pin. The strain gages are configured to measure loads in the load pin and to generate a signal proportional to the measured load.

Many load pins, such as those described above, may not have sufficiently stiff, isolated ends as compared to the sensing portion, where the strain gages are located. As a result, it can be difficult to obtain precision loading measurements from the instrumentation. In particular, the load pins may exhibit different behavior under tension and compression. This is typically attributed to the non-uniform loading of the pin under these different loading scenarios. As a result, the output from strain gages also varies.

Hence, there is a need for a load pin that provides improved performance over presently known load pins and/or that provides improved sensitivity under both tensile and compressive loads and/or exhibits similar tensile and compressive strains under given loading conditions. The present invention addresses one or more of these needs.

BRIEF SUMMARY

In one embodiment, a load pin includes a main body and a plurality of recesses. The main body includes a first end, a second end, and an outer surface. The outer surface defines a plurality of loading surfaces and a plurality of relief surfaces. Each loading surface is disposed between two of the relief surfaces and has a first diameter. Each relief surface has a second diameter that is less than the first diameter. The recesses are formed in and extend at least partially around the outer surface. Each recess has a substantially round inner surface, is formed in a different one of the relief surfaces, and is disposed between a different pair of loading surfaces.

In another embodiment, a load pin includes a main body, a main wiring channel, a plurality of recesses, a plurality of sensor pockets, and a plurality of sensor wiring channels. The main body includes a first end, a second end, and an outer surface. The outer surface defines a plurality of loading surfaces and a plurality of relief surfaces. Each loading surface is disposed between two of the relief surfaces and has a first diameter, and each relief surface has a second diameter that is less than the first diameter. The main wiring channel is formed in the main body, and has an opening formed in the first end of the main body and extends into the main body. The recesses are formed in and extend at least partially around the outer surface. Each recess has a substantially round inner surface, is formed in a different one of the relief surfaces, and is disposed between a different pair of loading surface. The sensor pockets are formed in the outer surface and extend partially into the main body. Each sensor pocket is disposed between a pair of loading surfaces and extends through the recess that is disposed between the same pair of loading surfaces. The sensor wiring channels extend between the main wiring channel and a different one of the sensor pockets.

In still another embodiment, a load pin includes a main body, a main wiring channel, a plurality of recesses, a plurality of sensor pockets, a plurality of sensor wiring channels, and a pair of adjustment channels. The main body includes a first end, a second end, an axis of symmetry that extends between the first end and the second end, and an outer surface. The outer surface defines a plurality of loading surfaces and a plurality of relief surfaces. Each loading surface is disposed between two of the relief surfaces and has a first diameter, and each relief surface has a second diameter that is less than the first diameter. The main wiring channel is formed in the main body, and has an opening formed in the first end of the main body and extending into the main body, at least parallel to the axis of symmetry, to an end. The recesses are formed in and extend at least partially around the outer surface. Each recess has a substantially round inner surface, is formed in a different one of the relief surfaces, and is disposed between a different pair of loading surface. The sensor pockets are formed in the outer surface and extend partially into the main body. Each sensor pocket is disposed between a pair of loading surfaces and extends through the recess that is disposed between the same pair of loading surfaces. The sensor wiring channels are disposed non-perpendicular to the axis of symmetry and extend between the main wiring channel and a different one of the sensor pockets. The adjustment channels are formed in the outer surface proximate the second end of the main body. The adjustment channels are diametrically opposed to each other, and each has a substantially flat bottom surface. The plurality of loading surfaces include a first loading surface, a second loading surface, and a third loading surface. A first pair of sensor pockets is disposed between the first loading surface and the second loading surface and are diametrically opposed to each other, and a second pair of sensor pockets is disposed between the second loading surface and the third loading surface and are diametrically opposed to each other.

Furthermore, other desirable features and characteristics of the load pin will become apparent from the subsequent detailed description and appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 3 depicts a side view of the load pin depicted in FIG. 2;

FIG. 4 depicts a close-up view of the portion of the load pin enclosed in the circle labeled with reference numeral 4 in FIG. 3.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although embodiments of a load pin are described as being implemented in a clevis fastener system, it will be appreciated that the load pin may be implemented in numerous and varied other systems.

Figure 1:
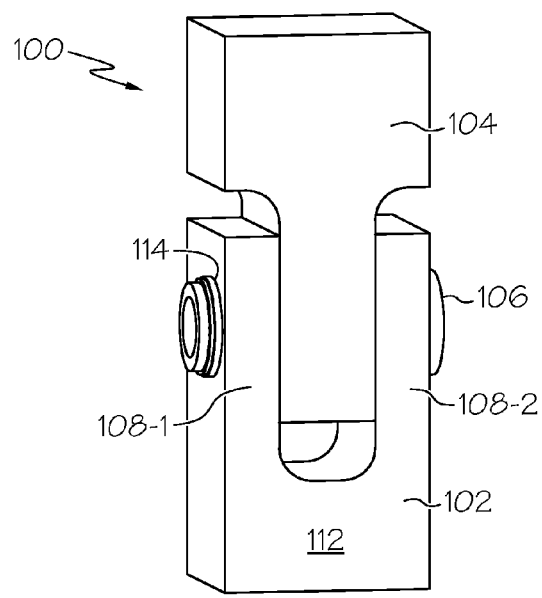
FIG. 1 depicts an embodiment of an exemplary clevis fastener system in which a load pin may be installed.

Referring first to FIG. 1, an embodiment of an exemplary clevis fastener system 100 is depicted. The clevis fastener system 100 includes a clevis 102, a tang 104, and a clevis pin 106. The clevis 102 includes a pair of spaced-apart prongs 108 (108-1, 108-2) that extend from a connection section 112. An opening 114 (only one visible in FIG. 1) extends through each of the prongs 108, and is dimensioned to receive the clevis pin 106. The tang 104 is disposed between the prongs 108 and has a non-visible opening through which the clevis pin 106 also extends. The clevis 102 may be coupled to a non-depicted machine and the tang 104 may be coupled to a non-depicted load, or vice-versa, depending upon the configuration of the clevis fastener system 100.

It is noted that the clevis pin 106 depicted in FIG. 1 is a load pin that is configured to provide improved load measurement performance under both tension and compression loads. An embodiment of the load pin is depicted more clearly in FIGS. 2-5, and with reference thereto will now be described in more detail.

Figure 2:
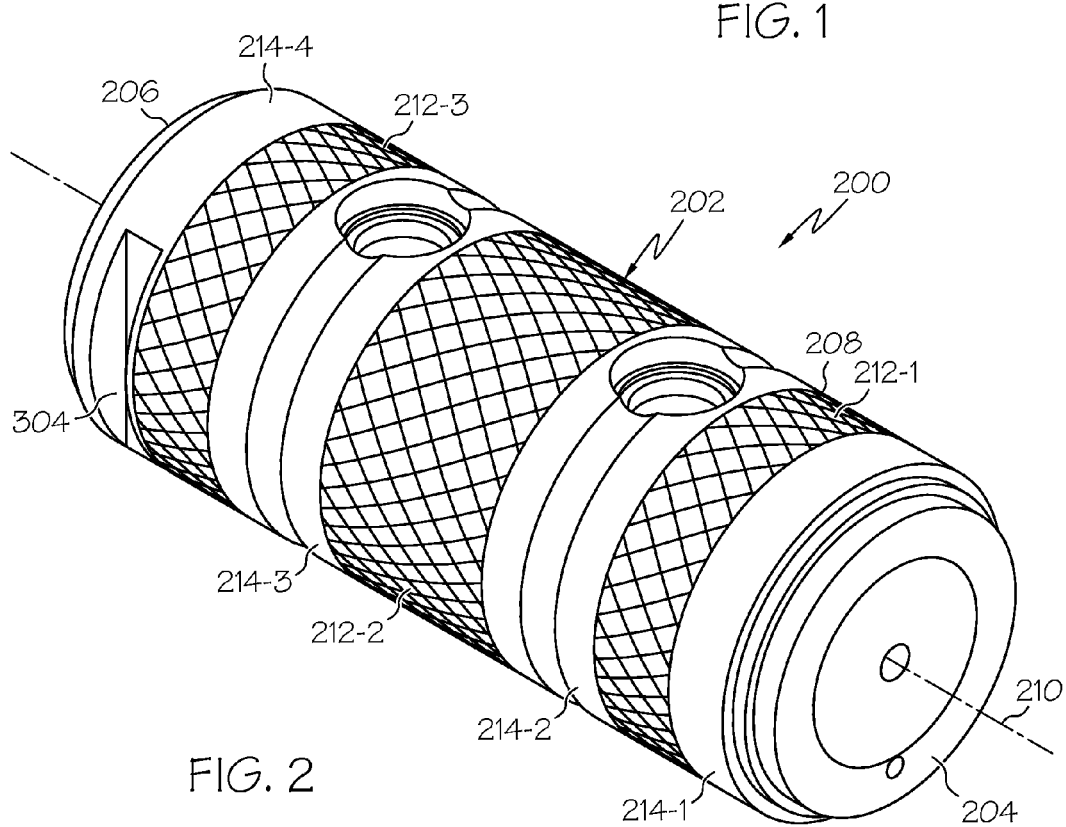
FIG. 2 depicts a plan view of an embodiment of a load pin that may be implemented in the clevis fastener system of FIG. 1.

The load pin 200 depicted in FIG. 2 has a main body 202 that includes a first end 204, a second end 206, and an outer surface 208. The main body 202, at least in the depicted embodiment, has an axis of symmetry 210 that extends between the first end 204 and the second end 208. The outer surface 208 defines a plurality of loading surfaces 212 and a plurality of relief surfaces 214. Although the number of loading surfaces 212 and relief surfaces 214 may vary, depending upon the end-use environment, in the depicted embodiment the load pin 200 includes three loading surfaces 212, referred to herein as a first loading surface 212-1, a second loading surface 212-2, and a third loading surface 212-3, and four relief surfaces 214, referred to herein as a first relief surface 214-1, a second relief surface 214-2, a third relief surface 214-3, and a fourth relief surface 214-4.

No matter the specific number of loading surfaces 212 and relief surfaces 214, it is seen that each of the loading surfaces 212 is disposed between two of the relief surfaces 214. Thus, for example, in the depicted embodiment the first loading surface 212-1 is disposed between the first and second relief surfaces 214-1, 214-2, the second loading surface 212-2 is disposed between the second and third relief surfaces 214-2, 214-3, and the third loading surface 212-3 is disposed between the third and fourth relief surfaces 214-3, 214-4. Moreover, and as shown more clearly in FIGS. 3 and 4, the loading surfaces 212 each have a first diameter ($d_1$), and each relief surface 214 has a second diameter ($d_2$) that is less than the first diameter ($d_1$). Although the difference between the first diameter ($d_1$) and the second diameter ($d_2$) may vary, in one particular embodiment, in which the load pin 200 is about 2.0 inches long, the first diameter ($d_1$) is about 0.005 inches larger than the second diameter ($d_2$).

With continued reference to FIGS. 2 and 3, it may be seen that the load pin 200 additionally includes a plurality of recesses 216 and a plurality of sensor pockets 218. Each recess 216 is formed in and extends at least partially around the outer surface 208 of the main body 202, and may have a substantially round inner surface 222. More specifically, each recess 216 is formed in a different one of the relief surfaces 214 and is disposed between a different pair of loading surfaces 212. The number of recesses 216 may vary, but in the depicted embodiment the load pin 200 includes a first recess 216-1 and a second recess 216-2. Thus, at least in the depicted embodiment, the first recess 216-1 is formed in the second relief surface 214-2, and the second recess 216-2 is formed in the third relief surface 214-2.

The sensor pockets 218 are also formed in the outer surface 208 of the main body 202, and are each configured to receive, and have mounted therein, a strain gage sensor (not depicted). As shown more clearly in FIG. 5, each of the sensor pockets 218 extends partially into the main body 202, and is disposed between a pair of loading surfaces 212. Each of the sensor pockets 218 also extend through the recess 216 that is disposed between the same pair of loading surfaces 212. Although the number of sensor pockets 218 may vary, the depicted embodiment includes four sensor pockets (218-1, 218-2, 218-3, 218-4). Two of the sensor pockets 218-1, 218-2 are disposed between the first and second loading surfaces 212-1, 212-2, and extend through the first recess 216-1, and the remaining two sensor pockets 218-3, 218-4 are disposed between the second and third loading surfaces 212-2, 212-3, and extend through the second recess 216-2.

Figure 5:
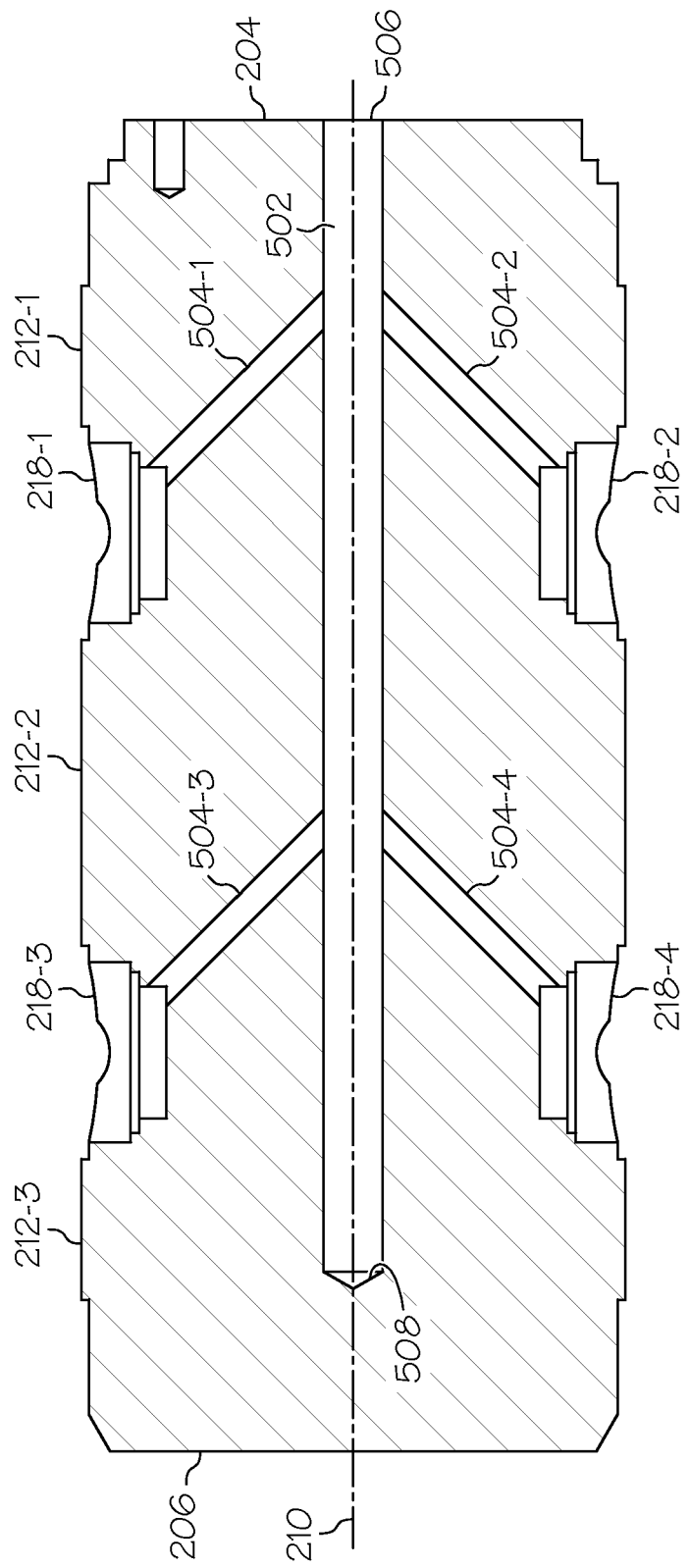
FIG. 5 depicts a cross section view of the load pin depicted in FIG. 2, and taken along line 5-5 in FIG. 3.

With continued reference to FIG. 5, the load pin 200 additionally includes a main wiring channel 502 and a plurality of sensor wiring channels 504. The main wiring channel 502 has an opening 506 that is formed in the first end 204 of the main body 202 and, at least in the depicted embodiment, extends into the main body 202 to a closed end 508. It will be appreciated, however, that in other embodiments the main wiring channel 502 may extend to an open end that is subsequently closed with a plug (or left open). The main wiring channel 502, at least in the depicted embodiment, extends into the main body 202 along the axis of symmetry 210, but in other embodiments it may extend at least parallel to the axis of symmetry.

The sensor wiring channels 504 are formed in the main body 202 and extend between the main wiring channel 502 and a different one of the sensor pockets 218. Thus, in the depicted embodiment, in which there are four sensor pockets 218, the load pin 200 includes four sensor wiring channels 504 (504-1, 504-2, 504-3, 504-4). The sensor wiring channels 504 may be variously configured, but in the depicted embodiment each is disposed non-perpendicular to the axis of symmetry 210.

The load pin 200, as mentioned above and as depicted in FIG. 1, may be disposed within a clevis fastener system 100 (or some other load bearing/transfer system). The load pin 200 is dimensioned so that the first end 204 and the second end 206 are accessible when disposed within the clevis fastener system 100. This allows external equipment or devices to be mounted on, or otherwise coupled to, the load pin 200, and for the load pin 200 to be adjustably rotated to a desired rotational orientation. To facilitate the mounting or coupling of external equipment, the first end 204 defines an external interface 302 (see FIG. 3). The external interface 302 has an outer diameter ($d_3$) that is less than the second diameter ($d_2$).

To facilitate rotation of the load pin 200, one or more adjustment channels 304 may be formed in the outer surface 208 of the main body 202, although the depicted embodiment includes two adjustment channels. The one or more adjustment channels 304 are formed proximate the second end 206 of the main body 202, and are disposed in diametric opposition to each other. Although the one or more adjustment channels 304 may be variously configured, in the depicted embodiment each is configured with a substantially flat bottom surface 306, which allows a user to engage the surfaces 306 with a tool and rotate the load pin 200 to a desired position.

The load pin 200 disclosed herein provides improved performance over presently known load pins. For example, the load pin 200 disclosed herein provides improved sensitivity under both tensile and compressive loads, the difference between tensile and compressive strains under given loading conditions is reduced, which provides a more linear output, and the load pin is less sensitive to the type of loading system that is used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A load pin, comprising:
a main body including a first end, a second end, and an outer surface, the outer surface defining a plurality of loading surfaces and a plurality of relief surfaces, each loading surface disposed between two of the relief surfaces and having a first diameter, each relief surface having a second diameter that is less than the first diameter;
a plurality of recesses formed in and extending at least partially around the outer surface, each recess having a substantially round inner surface, each recess formed in a different one of the relief surfaces and disposed between a different pair of loading surfaces; and
a pair of adjustment channels formed in the outer surface proximate the second end of the main body, the pair of adjustment channels diametrically opposed to each other, each adjustment channel having a substantially flat bottom surface.

2. The load pin of claim 1, further comprising:
a main wiring channel formed in the main body, the main wiring channel having an opening formed in the first end of the main body and extending into the main body.

3. The load pin of claim 1, further comprising:
a plurality of sensor pockets formed in the outer surface and extending partially into the main body, each sensor pocket disposed between a pair of the loading surfaces and configured to have a strain gage mounted therein.

4. The load pin of claim 3, wherein
the plurality of loading surfaces include a first loading surface, a second loading surface, and a third loading surface;
a first plurality of sensor pockets is disposed between the first loading surface and the second loading surface; and
a second plurality of sensor pockets is disposed between the second loading surface and the third loading surface.

5. The load pin of claim 4, wherein:
the first plurality of sensor pockets are offset from each other by an angle; and
the second plurality of sensor pockets are offset from each other by an angle.

6. The load pin of claim 5, further comprising:
a main wiring channel formed in the main body, the main wiring channel having an opening formed in the first end of the main body and extending into the main body to a closed end; and
a plurality of sensor wiring channels, each sensor wiring channel extending between the main wiring channel and a different one of the sensor pockets.

7. The load pin of claim 6, wherein:
the main body has an axis of symmetry that extends between the first end and the second end;
the main wiring channel extends at least parallel to the axis of symmetry; and
each sensor wiring channel is disposed non-perpendicular to the axis of symmetry.

8. The load pin of claim 1, wherein:
the first end defines an external interface; and
the external interface has an outer diameter that is less than the second diameter.

9. A load pin, comprising:
a main body including a first end, a second end, and an outer surface, the outer surface defining a plurality of loading surfaces and a plurality of relief surfaces, each loading surface disposed between two of the relief surfaces and having a first diameter, each relief surface having a second diameter that is less than the first diameter;
a main wiring channel formed in the main body, the wiring channel having an opening formed in the first end of the main body and extending into the main body;
a plurality of recesses formed in and extending at least partially around the outer surface, each recess having a substantially round inner surface, each recess formed in a different one of the relief surfaces and disposed between a different pair of loading surface;
a pair of adjustment channels formed in the outer surface proximate the second end of the main body, the pair of adjustment channels diametrically opposed to each other, each adjustment channel having a substantially flat bottom surface;
a plurality of sensor pockets formed in the outer surface and extending partially into the main body, each sensor pocket disposed between a pair of loading surfaces and extending through the recess that is disposed between the same pair of loading surfaces; and
a plurality of sensor wiring channels, each sensor wiring channel extending between the main wiring channel and a different one of the sensor pockets.

10. The load pin of claim 9, wherein
the plurality of loading surfaces include a first loading surface, a second loading surface, and a third loading surface;
a first pair of sensor pockets is disposed between the first loading surface and the second loading surface; and
a second pair of sensor pockets is disposed between the second loading surface and the third loading surface.

11. The load pin of claim 10, wherein:
the first pair of sensor pockets are diametrically opposed to each other; and
the second pair of sensor pockets are diametrically opposed to each other.

12. The load pin of claim 9, wherein:
the main body has an axis of symmetry that extends between the first end and the second end;

the main wiring channel extends at least parallel to the axis of symmetry; and each sensor wiring channel is disposed non-perpendicular to the axis of symmetry.

13. The load pin of claim 9, wherein:

the first end defines an external interface; and the external interface has an outer diameter that is less than the second diameter.

14. A load pin, comprising:

a main body including a first end, a second end, an axis of symmetry that extends between the first end and the second end, and an outer surface, the outer surface defining a plurality of loading surfaces and a plurality of relief surfaces, each loading surface disposed between two of the relief surfaces and having a first diameter, each relief surface having a second diameter that is less than the first diameter;

a main wiring channel formed in the main body, the main wiring channel having an opening formed in the first end of the main body and extending into the main body, at least parallel to the axis of symmetry, to a closed end;

a plurality of recesses formed in and extending at least partially around the outer surface, each recess having a substantially round inner surface, each recess formed in a different one of the relief surfaces and disposed between a different pair of loading surface;

a plurality of sensor pockets formed in the outer surface and extending partially into the main body, each sensor pocket disposed between a pair of loading surfaces and extending through the recess that is disposed between the same pair of loading surfaces;

a plurality of sensor wiring channels, each sensor wiring channel disposed non-perpendicular to the axis of symmetry and extending between the main wiring channel and a different one of the sensor pockets;

a pair of adjustment channels formed in the outer surface proximate the second end of the main body, the pair of adjustment channels diametrically opposed to each other, each adjustment channel having a substantially flat bottom surface, wherein:

the plurality of loading surfaces include a first loading surface, a second loading surface, and a third loading surface, a first pair of sensor pockets is disposed between the first loading surface and the second loading surface and are diametrically opposed to each other, and a second pair of sensor pockets is disposed between the second loading surface and the third loading surface and are diametrically opposed to each other.

* * * * *